United States Patent [19]
Plackmann et al.

[11] 3,839,196
[45] Oct. 1, 1974

[54] REACTOR-TO-REGENERATOR CATALYST TRANSPORT METHOD

[75] Inventors: Daniel G. Plackmann, Palatine; Richard L. Stevens, Elk Grove Village; Arthur R. Greenwood, Niles; Wesley L. Kiel, Des Plaines, all of Ill.

[73] Assignee: Universal Oil Products Company, Des Plaines, Ill.

[22] Filed: Aug. 9, 1973

[21] Appl. No.: 387,089

[52] U.S. Cl. .............................. 208/174, 23/288 G
[51] Int. Cl. ........................ C10g 11/16, C10g 35/12
[58] Field of Search ................... 208/174; 23/288 G

[56] References Cited
UNITED STATES PATENTS

| | | | |
|---|---|---|---|
| 2,414,373 | 1/1947 | Gerhold | 208/174 |
| 2,756,193 | 7/1956 | Bergstrom | 208/174 |
| 2,913,404 | 11/1959 | Lieffers et al. | 23/288 G |
| 2,958,650 | 11/1960 | Dart et al. | 208/174 |
| 3,647,680 | 3/1972 | Greenwood et al. | 23/288 G |
| 3,725,248 | 4/1973 | Greenwood et al. | 208/138 |

*Primary Examiner*—Herbert Levine
*Attorney, Agent, or Firm*—James R. Hoatson, Jr.; Robert W. Erickson; William H. Page, II

[57] ABSTRACT

Applicable to a catalytic reaction system wherein a hydrocarbonaceous stream is reacted with hydrogen in contact with catalyst particles movable through the reaction system via gravity-flow, the present inventive concept affords the controlled transport of catalyst particles from a reaction system to a catalyst regeneration facility integrated therewith. The system is especially adaptable to be utilized on cooperation with a multiple-stage reaction system wherein catalyst particles flow in series, from one reactor to another, and deactivated catalyst particles from the last reactor are to be transported to the regeneration facility.

10 Claims, 1 Drawing Figure

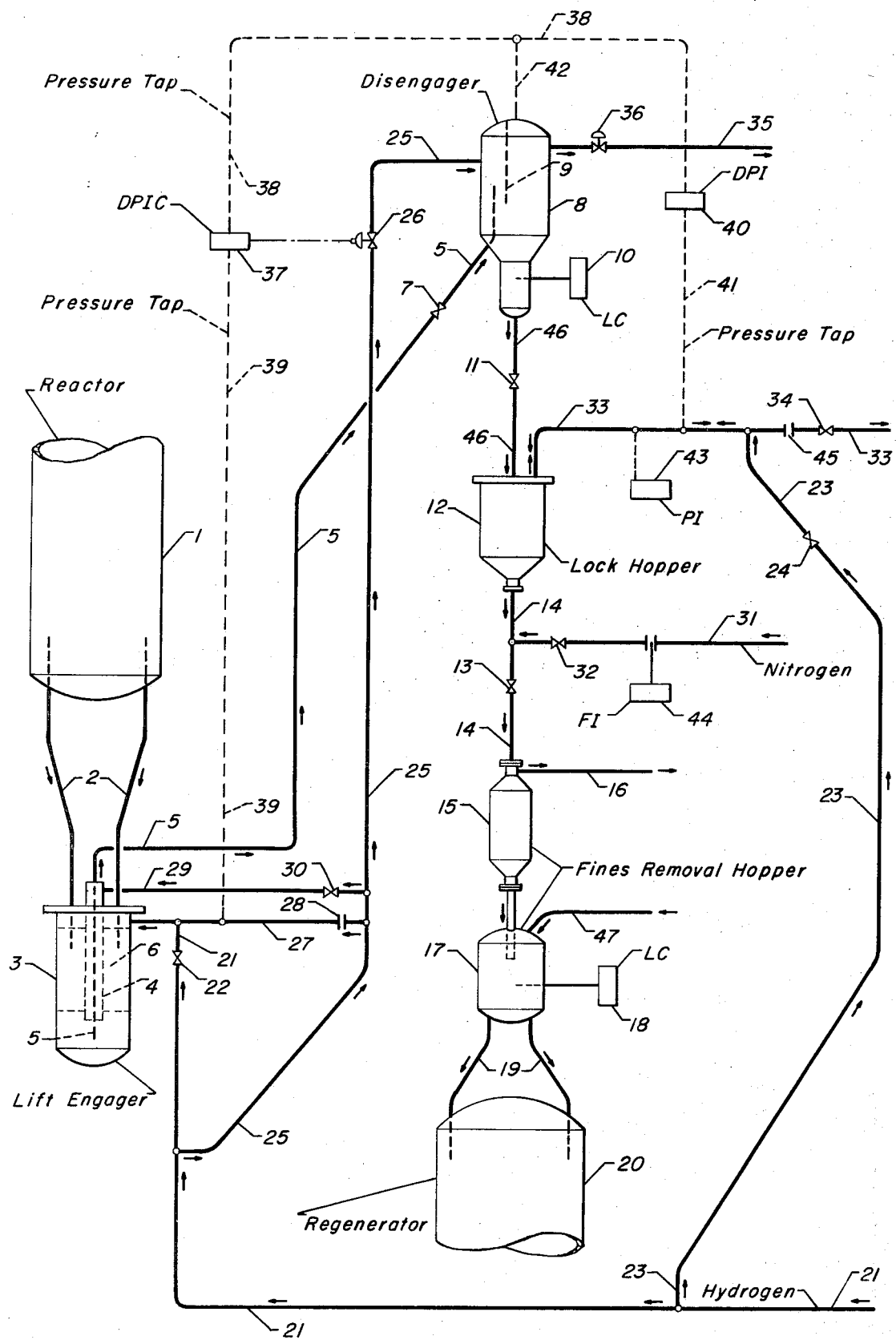

REACTOR-TO-REGENERATOR CATALYST TRANSPORT METHOD

APPLICABILITY OF INVENTION

The present invention is directed toward an improved means and method for effecting the conversion of a hydrocarbonaceous reactant stream in a catalytic reaction system through which catalyst particles are movable via gravity-flow, and which catalyst particles are intended to be regenerated in a regeneration facility integrated with the reaction system. More particularly, our inventive concept affords a controlled method of transferring catalyst particles from the reaction system to the regeneration facility. The present catalyst transport system is adaptable for utilization in multiple-stage reaction processes, as well as single-stage reaction processes, and wherein the conversion reactions are either principally exothermic, or endothermic. Similarly, the flow of the hydrocarbonaceous reactant stream, with respect to the direction of movement of the catalyst particles through the reaction system, may be cocurrent or countercurrent.

Various types of single and multiple-stage reaction systems have found widespread utilization throughout the petroleum and petrochemical industries. These are employed to effect a multitude of reactions, and particularly hydrocarbon conversion reactions. With respect to multiple-stage reaction systems, they are generally of two types: (1) those existing in side-by-side configuration, with intermediate heating and/or cooling between reaction zones, and wherein the reactant stream or mixture flows serially from one zone to another zone; and, (2) a stacked design wherein a single reaction chamber contains the multiple catalytic contacting stages. The numerous hydrocarbon reactions being effected include both hydrogen-producing and hydrogen-consuming reactions. As applied to petroleum refining, the systems have been used to effect those hydrocarbon conversion reactions prevalent in catalytic reforming, fixed-bed alkylation, ethylbenzene dehydrogenation to produce styrene, other dehydrogenation processes, hydrorefining, isomerization, desulfurization, hydrocracking, hydrogenation, transalkylation, steam reforming for substitute natural gas production, etc. Our invention is intended for utilization in a single-stage reaction system, in a multiplestage reaction system in side-by-side relation, in a system where two or more catalytic contact zones are "stacked," or in a stacked system having one or more additional reaction zones in side-by-side relationship with the stack. Since catalyst particles which are movable through a reaction system by way of gravity-flow are necessarily moving in a downwardly direction, the present transport system contemplates the withdrawal of catalyst particles from a bottom portion of a reaction zone and the ultimate transport thereof to the top portion of the regeneration facility. It is understood that the particular design of the reaction zones within the system is immaterial to the present invention; that is, the present transport system is applicable to reaction systems wherein the catalyst is disposed as an annular bed, or as a cylindrical bed having substantially the same cross-sectional area as the reaction vessel.

In the interest of brevity, and not with the intent of unduly limiting our invention, the following discussion will be directed toward those reaction systems wherein a downwardly moving bed of catalyst particles is employed in the cocurrent conversion of a hydrocarbonaceous reactant stream with hydrogen, the catalyst particles being disposed in the form of an annular bed. Briefly, the annular-bed system comprises a reaction chamber containing a coaxially disposed catalyst-retaining screen, having a nominal, internal cross-sectional area less than the chamber, and a perforated centerpipe having a nominal, cross-sectional area less than the catalyst-retaining screen. The hydrocarbonaceous reactant stream is introduced into the annular-form space created between the inside wall of the chamber and the outside surface of the catalyst-retaining screen. The latter forms an annular-form, catalyst-holding zone with the outside surface of the perforated centerpipe; the reactant stream flows laterally and radially through the screen and catalyst zone into the centerpipe and out of the reaction chamber. Judicious design and operating considerations obviously require that the openings both in the centerpipe and the catalyst-retaining screen be sized to restrict the passage therethrough of catalyst particles.

OBJECTS AND EMBODIMENTS

A principal object of our invention is to provide a controlled reactor-to-regenerator catalyst transport system for utilization in a hydrocarbon conversion process. A corollary objective is to provide an improved method for withdrawing catalyst particles from a reaction zone, functioning in a hydrogen atmosphere, and through which reaction zone the particles are movable via gravity-flow, and transporting the withdrawn catalyst particles to a regeneration facility functioning in an oxygen-containing atmosphere.

Another object of our invention is to provide a controlled system for transferring catalyst particles from a hydrocarbon conversion reaction zone to a regeneration facility in which deactivated catalyst particles are subjected to regeneration.

Therefore, in a catalytic reaction system, having an integrated catalyst regeneration facility, wherein (1) a hydrocarbonaceous stream is reacted with hydrogen in contact with catalyst particles which are movable through said system via gravity-flow, (2) catalyst particles removed from said system are introduced into said regeneration facility, and (3) said catalyst particles are movable through said regeneration facility via gravity-flow, our invention provides the method of transferring catalyst particles from said reaction system to said regeneration facility, which method comprises the steps of: (a) withdrawing catalyst particles from the bottom of a reaction zone through a plurality of catalyst-withdrawal conduits; (b) introducing said catalyst particles, via said conduits, into an upper portion of a withdrawal and transport vessel while simultaneously and continuously introducing a fluid purge stream into said vessel, and countercurrently flowing said purge stream through said conduits to remove hydrocarbons from said catalyst particles; (c) when the level of catalyst particles in said transport vessel contacts the discharge end of said conduits, thereby automatically terminating the flow of catalyst particles therethrough, then introducing a fluid life stream downwardly into an annular space formed by imperforate first and second concentric centerpipes, disposed in said vessel, at a velocity sufficient to lift said catalyst particles upwardly through the inner concentric centerpipe and out of said transport vessel; (d) substantially simultaneously with the introduction of said fluid lift steam, increasing the velocity of said purge stream to a level which maintains the terminated flow of catalyst particles within said withdrawal conduits; (e) flowing the removed catalyst particles and said lift stream upwardly through a lift line and introducing the same into a fluid-solids disengaging vessel and separating said catalyst particles from said fluid lift stream; (f) when substantially all of the withdrawn catalyst particles have passed through said lift line into said disengaging vessel, (i) terminating the flow of said fluid lift stream, (ii) equalizing the pressure between said disengaging vessel and a valve-blocked lock hopper and, (iii) introducing said catalyst particles into said lock hopper; (g) isolating said lock hopper from said disengaging vessel and contacting said catalyst particles with an inert fluid purge stream to remove hydrogen therefrom; (h) equalizing the presure between said lock hopper and a regeneration facility, and (i) introducing the resulting purged catalyst particles into the upper portion of said regeneration facility through a plurality of catalysttransfer conduits. In another embodiment, the purged catalyst particles are introduced into a fines removal hopper prior to being transferred to said regeneration facility.

These as well as other objects and embodiments, will become evident from the following, more detailed description of the controlled reactor-to-regenerator catalyst transport system and the method of transporting catalyst particles utilizing the same. In one such other embodiment, the pressure between said disengaging vessel and said transport vessel is equalized after said catalyst particles have been introduced into the lock hopper and after said lock hopper is isolated from said disengaging vessel.

PRIOR ART

As hereinbefore set forth, our inventive concept is applicable to hydrocarbon conversion processes which utilize reaction systems wherein the catalyst particles are movable via gravity-flow. Such systems, as applied to petroleum refining, may be used in a wide variety of hydrocarbon conversion reactions including catalytic reforming, alkylation, hydrorefining, hydrocracking, dehydrogenation, hydrogenation, steam reforming, etc. In order to achieve a degree of simplicity and brevity, our invention will be additionally described, in part, in conjunction with the well-known catalytic reforming process. However, it is understood that the controlled reactor-to-regenerator catalyst transport system affords a distinct improvement in other hydrocarbon conversion processes where characterized by a reaction system in which catalyst particles are movable by way of gravity-flow.

Historically, the initial emergence of catalytic reforming took the form of a non-regenerative, fixed-bed system comprising a plurality of reaction zones in side-by-side relation. When the catalytic composite had become deactivated to the extent that continuous operation was no longer economically feasible, the entire unit was shut down and the catalyst regenerated in situ. After several such regenerations, the catalyst was replaced with fresh catalyst and the deactivated catalyst subjected either to a reconditioning technique, or to a tedious, complicated method for the recovery of the catalytically active metals. Of more recent vintage is the so-called "swing bed" system, in which an extra reactor containing newly regenerated catalyst is substituted for that one due to be taken off-stream for the purposes of regeneration. Notwithstanding the required increase in catalyst inventory, this system gained wide acceptance in view of the fact that the entire unit was not caused to be shut down except for major operational upsets, or periodic turn-arounds for maintenance purposes.

Still more recently, reaction systems have been developed for catalytic reforming, as well as other processes, in which the catalyst particles are movable via gravity-flow. The first of these was directed toward a multiple-stage system with the reaction zones being in side-by-side relationship. Deactivated catalyst was withdrawn from each reaction zone and transported to a suitable regeneration facility, while fresh, or regenerated catalyst was added to the upper portion of each reaction zone. A "stacked" reactor system has been provided in which the catalyst particles flow, via gravity, downwardly from one catalyst-containing zone to another. Ultimately, the catalyst is transferred to a suitable regeneration system, also preferably functioning with a downwardly moving bed of catalyst. With respect to such systems, the catalyst particles are effectively maintained within the reaction system, being transferred from one reaction zone to another in a manner such that the flow of particles is continuous, at frequent intervals, or at extended intervals, with the movement being controlled by the quantity of catalyst withdrawn from the last of the series of individual reaction zones.

Illustrative of a reaction zone, wherein the reactant stream, in admixture with hydrogen, is caused to flow laterally and radially through the catalyst, is that described in U.S. Pat. No. 2,683,654 (Cl. 23-388). This type of reactor is intended for the common fixed-bed system wherein the catalyst is either subjected to in situ regeneration, or is replaced. With modifications with respect to hardware, a downwardly-moving bed of catalyst particles can be provided.

U.S. Pat. No. 3,470,090 (Cl. 208–138) illustrates a multiple-stage, side-by-side reaction system with intermediate heating of the reactant stream which flows serially through the individual reaction zones. Catalyst withdrawn from any one of the reaction zones is transported to suitable regeneration facilities. A system of this type can be modified to the extent that the catalyst particles withdrawn from a given reaction zone are transported to the next succeeding reaction zone, while that catalyst withdrawn from the last reaction zone may be transported to a suitable regeneration facility. It should be noted that there is no awareness of a method by which the transport of catalyst particles is effected.

U.S. Pat. No. 3,652,231 (Cl. 23-288G) illustrates a reconditioning system in which the catalyst particles are movable via gravity-flow, and from which the reconditioned particles are transported to a reaction system. A stacked reaction zone configuration is shown in U.S. Pat. No. 3,647,680 (Cl. 208-65), as a two-stage system having an integrated regeneration facility which receives that catalyst withdrawn from the bottom reaction zone. Similar stacked configurations are illustrated in U.S. Pat. No. 3,692,496 (Cl. 23-288G) and U.S. Pat. No. 3,725,249 (Cl. 208-139). None of these patents disclose the specific, controlled method for effecting the transport of the deactivated catalyst particles from the reaction system to the regeneration facility, in accordance with the present invention.

U.S. Pat. No. 3,725,248 (Cl. 208-138) is illustrative of a multiple-stage system in side-by-side configuration, with gravity-flowing catalyst particles being transported from the bottom of one reaction zone to the top of the next succeeding reaction zone, those particles being removed from the last reaction zone being transported to suitable regeneration facilities. This reference also discloses the countercurrent flow of the hydrocarbonaceous reactant stream with respect to the movement of catalyst particles from one reaction zone to another; that is, the reactant stream flows from reactor 1 to reactor 2 to reactor 3, whereas the catalyst particles flow from reactor 3 to reactor 2 to reactor 1. However, the flow of the reactant stream through a given reactor is cocurrent with the flow of catalyst particles therethrough.

Significantly, although the foregoing represent meritorious advances in the art of hydrocarbon processing, and especially in catalytic reforming, and illustrate, in a broad sense, the transport of catalyst particles to a regeneration facility, they do not provide, either singly, or collectively, a controlled technique for accomplishing the same.

SUMMARY OF INVENTION

As hereinbefore set forth, the controlled catalyst transport system encompassed by the present inventive concept is suitable for utilization in a multitude of hydrocarbon conversion processes having integrated therein a suitable regeneration facility. More specifically, the controlled system is intended to effect the transport of catalyst particles from a reaction zone, characterized by a hydrogen atmosphere, to a regeneration facility wherein catalyst particles are subjected to an oxygen-containing atmosphere. For the sole purpose of additional illustration, and not with the intent of limiting the applicability of our invention, the following discussion is principally directed toward catalytic reforming. As previously illustrated, catalytic reforming has gone through several development phases currently terminating in a reaction system wherein the catalyst particles are in the form of a descending column in one or more reaction vessels. Typically, the catalytic composite is utilized in a substantially spherical form having a nominal diameter ranging from about one thirty-second-inch to about one-eighth-inch, which size range affords free-flow characteristics which will not bridge, or block the descending column, or columns of catalyst particles within the overall system. A plurality of relatively small diameter catalyst-withdrawal conduits are employed to remove the catalyst particles from the reaction system, while a second plurality of such conduits are utilized to transfer the transported particles into the upper portion of the regeneration facility. In order to enhance gravity-flow of the particles, it is particularly important that the same have a relatively small diameter, and one which is preferably less than about one-eighth-inch. The conduits, whether for catalyst-withdrawal, or catalyst-transfer, are uniformly distributed throughout the cross-sectional area of the catalyst bed in the reaction system and in the regeneration system, and generally number from about 6 to about 16.

Catalytic reforming of hydrocarbons is generally effected in a vapor-phase operation at conditions including catalyst temperatures in the range of about 700°F to about 1,000°F. Other operating variables include pressures from about 50 psig. to about 1,000 psig., liquid hourly space velocities from about 0.2 to about 10.0 and hydrogen to hydrocarbon mole ratios in the range of about 1.0:1.0 to about 10.0:1.0. Reaction systems having catalyst particles movable therethrough via gravity-flow are particularly adaptable for low-pressure operation -- i.e., from about 50 psig. to about 400 psig. In view of the fact that catalytic reforming reactions are principally endothermic in nature, the multiple-stage system will employ interstage heating of the effluent from a preceding zone, prior to the introduction thereof into the next succeeding zone.

The reactor-to-regenerator catalyst transport system, as hereinbefore set forth, is intended for utilization in a reaction system wherein the conversion of hydrocarbons is effected in a hydrogen-containing atmosphere and at least one step in the catalyst regeneration technique involves the use of an oxygen-containing atmosphere. As will be recognized by those possessing the requisite skill in the art, the transport of catalyst particles from a hydrogen atmosphere to an oxygen atmosphere necessitates extremely careful control in order to preclude the occurrence of hazardous situations. The system encompassed by our inventive concept provides reliability and the required safety through the utilization of self-checking circuits. Throughout a series of individual steps, as hereinafter set forth in greater detail, input signals are required to respond properly either to the presence, or absence of a flow, pressure, pressure differential or level. As the controlled system proceeds through the cycle, any malfunction is detected and the cycle ceases until such time as the malfunction has been corrected.

Catalyst particles are withdrawn from the reaction system, through a plurality of catalyst-withdrawal conduits and are introduced thereby into the upper portion of a withdrawal and transport vessel. The catalyst-withdrawal conduits generally number from about 6 to about 16 and, in order to insure uniform flow of the catalyst particles, are uniformly spaced throughout the cross-sectional area of the catalyst bed. The withdrawal and transport vessel is sometimes referred to herein as a lift-engager, since it serves both the function of collecting the catalyst withdrawn from the reaction system and that of transporting the same to the regeneration facility. The lift-engager contains an imperforate centerpipe through the center of which a concentric lift line is disposed. The annular space created between the centerpipe and the interior wall of the lift-engager is divided into a plurality of individual collection zones of substantially equal volume, into each one of which one catalyst-withdrawal conduit discharges. As the catalyst in each collection zone attains the level of the discharge end of the conduit, the flow of catalyst therethrough automatically terminates.

A fluid purge stream, preferably hydrogen, is continuously introduced into the annular space of the lift-engager, and strips hydrocarbons from the catalyst particles by countercurrent contact therewith in the withdrawal conduits. After the flow of catalyst particles into the lift-engager has ceased, a fluid lift stream, preferably hydrogen, is introduced downwardly into the annular space formed by the imperforate centerpipe and the concentric lift line disposed therein. These streams may be a portion of the hydrogenrich recycled gaseous phase generally separated from the ultimate product effluent. The velocity of the fluid lift stream, downwardly into the annular space formed between the concentric centerpipes, is sufficient to lift the catalyst particles from the bottom of the lift-engager upwardly through the inner concentric centerpipe (lift line) and out of the transport vessel.

Substantially simultaneously with the introduction of the fluid lift stream, the velocity of the continuous purge stream is increased to a level which inhibits the continued flow of catalyst particles downwardly through the withdrawal conduits, while previously withdrawn catalyst particles are being removed via the lift-engager and lift line. The velocity of the purge stream in the withdrawal conduits, is less than that which would effect a reversal of catalyst flow, or a fluidization of the catalyst bed. The catalyst particles and lift stream flow upwardly through the lift line and are introduced into a fluid-solids disengaging vessel wherein catalyst particles are separated from the fluid lift stream. When substantially all the withdrawn catalyst particles have passed through the lift line into the vapor-solids disengaging vessel, the flow of the fluid lift stream is terminated. After the termination of the flow of the fluid lift stream, the continuous purge stream is decreased to its original level, thus permitting more catalyst particles to be withdrawn from the reaction system.

From the vapor-solids disengaging vessel, the catalyst particles are introduced into a valve-blocked lock hopper. However, it is first necessary that the lock hopper be brought to the same pressure level as exists within the disengaging vessel. For this purpose, hydrogen or a portion of the hydrogen-rich gaseous phase recovered in the product effluent separation system is utilized. When no pressure differential exists between the disengaging vessel and the lock hopper, the flow of hydrogen-containing gas is ceased and the valves intermediate the disengaging vessel and the lock hopper are opened, thereby permitting the catalyst particles to flow into the lock hopper. When substantially all the catalyst particles have been removed from the disengaging vessel, the lock hopper is once again blocked-out of the system in order that the catalyst particles may be purged free from hydrogen and hydrocarbonaceous material. These components must be removed prior to the oxidative regeneration technique, since they increase the quantity of material that must be oxidized and may adversely affect the activity of the regenerated catalyst. More importantly, the purging is done in order to avoid the hazardous situation which can occur when transferring catalyst from a hydrogen/hydrocarbon atmosphere to an oxygen-containing atmosphere. The purging technique involves the use of a relatively inert purge medium such as nitrogen, helium, argon, etc., with nitrogen being particularly preferred. Prior to the commencement of the purging technique, the lock hopper is depressured, through a vent line which contains a restriction orifice, to a controlled level in the range of about 0 psig. to about 5 psig. The purpose of the restriction orifice is to limit the flow during depressuring and to effect an increase in the pressure within the lock hopper as the nitrogen purge stream is introduced. In general practice, the pressure is increased to a level of about 5.0 to about 20.0 psig. over a time period ranging from about 10 seconds to about 60 seconds. The pressure is then lowered, preferably to the initial pressure, over a period of about 10 seconds to about 60 seconds, during which time the flow of nitrogen purge gas may or may not be continued. This sequence of pressurization and depressurization, particularly when repeated from about 2 to about 10 times, insures that the purge gas reaches all parts of the lock hopper chamber in which the catalyst is contained and thus removes all of the volatile material from the catalyst particles.

After the purging technique has been repeated the desired number of times, and the pressure in the lock hopper has been equalled to the pressure in the fines removal hopper, the vent line is closed and the block valve between the lock hopper and a fines removal hopper is opened, thereby permitting the catalyst particles to flow through the fines removal hopper and, by way of a plurality of catalyst transfer conduits, to enter the upper portion of the regeneration facility. Catalyst fines and powder are removed from the bulk of the catalyst particles by elutriation in a conduit within the fines removal hopper.

In order to enhance and facilitate the smooth, uninhibited flow of catalyst particles throughout the entire system, while simultaneously diminishing the loss thereof due to attrition, cautious design considerations dictate a minimum of sharp turns, or bends wherever the flow of catalyst particles is being effected. Therefore, it is preferred that the withdrawal and transport vessel be coaxially disposed below the reaction system from which the catalyst particles are being withdrawn. Similarly, it is preferred that the vapor-solids disengaging vessel, lock hopper and fines removal hopper be coaxially disposed.

As hereinafter set forth, in the description of the accompanying drawing, the above-described catalyst transport technique lends itself to a programmed control which utilizes a unique logic system to provide for substantially continuous catalyst movement, with each step being effected in its proper sequence. Within the transfer system, a portion of the entire catalyst inventory is subject to movement continuously with the exception of the time-delays built into the logic control for the purpose of insuring that certain steps, or stages, have been completed, or that the same should be instituted. Similarly, with the same exception, catalyst particles will continually be moving, via gravity-flow, through one or more reaction zones and/or the regenerating facility. Therefore, it can be said that the present inventive concept provides for the "continuous" transport of catalyst particles from a reaction system to a regenerating facility.

DESCRIPTION OF DRAWING

Our controlled reactor-to-regenerator catalyst transport system will be described in greater detail with reference to the accompanying drawing. The drawing is presented as an extremely simplified schematic flow diagram in which only those lines, valves, etc., relevant to the flow of catalyst particles are shown. It is understood that the drawing is intended only for illustration, and is not construed as limiting our invention beyond the scope and spirit of the appended claims. The principal vessels indicated are the bottom of a catalytic conversion zone 1, a lift-engager 3, a vapor-solids disengager 8, a lock hopper 12 and the upper portion of a regenerator 20. A fines removal hopper is also illustrated, being shown as two vessels 15 and 17. The former may be considered a fines, or dust removal zone, while the latter serves as a catalyst particle collector and distribution zone. Also illustrated is a differential pressure indicator controller (DPIC) 37, a level control (LC) 10, a differential pressure indicator (DPI) 40, a pressure indicator (PI) 43, a flow indicator (FI) 44 and a level controller (LC) 18.

With specific reference now to the drawing, several assumptions are deemed required for illustration purposes and to afford a clear understanding of the method of transporting catalyst particles from the bottom of reactor 1 to the upper portion of regenerator 20 in accordance with the present invention. A single cycle of the controlled catalyst transport system involves a series of programmed steps which are caused to be performed in the proper sequence by a logic-control system. Since the cycle is repetitious and virtually continuous, with the exceptions of certain time-delays and interlocks, any given step within the sequence can be selected as the starting point for the purpose of illustration. Therefore, it will be presumed that: (i) lift-engager 3 is full of catalyst particles and flow from reactor 1 through conduits 2 has been automatically terminated; (ii) disengager 8 is full of catalyst particles; (iii) valve-blocked lock hopper 12 is full of catalyst particles and under hydrogen pressure; and, (iv) the fines removal hopper 17 is being emptied via conduits 19 into regenerator 20.

Furthermore, reactor 1 is at a discharge pressure of about 318 psig., as is disengager 8, and DPIC 37 is controlling the pressure differential at zero. Lock hopper 12 is also under a hydrogen pressure of 318 psig., and DPI 40 indicates a zero pressure differential between the lock hopper and disengager 8. All valves are in a closed position except flow control valves 26 and 36, the latter venting hydrogen through line 35; the vented stream may be introduced into the reaction products separation system (not illustrated). This situation constitutes Step "0", or "ready", in the logic-controlled sequence, during which the catalyst particles are flowing from hopper 17, through catalyst-transfer conduits 19, into regenerator 20, the latter at a pressure from atmospheric to about 5.0 psig.

When fines removal hopper 17 is known to be substantially void of catalyst particles, as sensed by LC 18, Step I begins with an enabling signal from LC 18 to the logic system, thereby calling for valve 34 to open in order to depressure lock hopper 12, through line 33, to the vent system. Pressure Indicator 43 has its set point at the same pressure as exists in regenerator 20 — i.e., about 2.0 psig. When lock hopper 12 has been depressured, Step I ends and Step II commences.

Step II starts with valve 32, in line 31, being caused to open, permitting nitrogen flow, for purge purposes, upwardly through the catalyst particles in lock hopper 12, through line 33 and valve 34 into the vent system. When FI 44 confirms nitrogen flow, a timer starts; the timer is set for a period of from 10 to 60 seconds. Restriction orifice 45, in line 33, is sized such that the flow of nitrogen into lock hopper 12 causes the pressure therein to increase to a level of about 5.0 psig. to about 20.0 psig. — i.e., about 10.0 psig. When the timer times out, valve 32 is caused to close and the catalyst particles are purged as lock hopper 12 depressures over a period of 10 to 60 seconds. An automatic counter is integrated into the sequence with the timer in such a manner that the pressurization/depressurization cycle is repeated, as above described, from two to about ten times — i.e., about three. After the purging sequence has completed the required number of cycles, as called for by the counter, valve 32 closes for the last time in the cycle.

Step III can be said to commence with the logic system calling for vent valve 34 to close, after pressure indicator 43 determines that the pressure in the lock hopper has decreased to the regenerator pressure. When the closed position of valves 32 and 34 is verified, valve 13 opens and remains open on unload timer. Lock hopper 12 unloads the purged catalyst through line 14 into fines removal hopper 17. Fines and dust are removed through the upper section 15, via line 16, and transported thereby to a dust collector. Dust removal is effected via elutriation, in upper section 15 and the conduit extending into hopper 17, caused by a purge gas, preferably nitrogen, entering the hopper via line 47 at a rate to effect a velocity in section 15 sufficient to remove fines and dust through line 16, but insufficient to cause whole catalyst particles to enter line 16. The purge gas, dust and fines may be sent to a dust collector for fines recovery and recycle of the purge gas through line 47. When the unload timer times out, valve 13 closes, and Step III has been completed.

In part, Step IV includes an interlock stage which is used to verify the proper termination of the preceding step and that DPIC 37, in conjunction with control valve 26, in line 25, is controlling a zero pressure differential between lift-engager 3 and disengaging vessel 8; that is, there exists a stable pressure in disengager 8. Also, there is verification that all valves are closed with the exception of valves 26 and 36. At this point, lock hopper 12 is under a pressure of about 2.0 psig. and disengager 8 at about 318 psig. When verification is obtained, valve 24, in line 23, opens and diverts hydrogen from line 21 through line 33 into lock hopper 12. When DPI 40 indicates a zero pressure differential with respect to disengager 8, via pressure taps 41 and 38 (via tap 42), valve 24 closes. When verification is obtained, valve 11 opens and catalyst particles flow through line 46 into lock hopper 12. After a time delay, to insure substantially complete removal of catalyst particles from disengager 8, valve 11 closes to terminate Step IV.

At this stage of the catalyst transport cycle, the lift-engager is considered in a "rest" position, and another interlock is imposed to insure that Step V may be enabled. This occurs when LC 10 is energized and indicates that disengaging vessel 8 is capable of receiving another load of catalyst particles. Again, all valves are closed except 26 and 36. which are controlling, as previously stated, a zero pressure differential between the lift-engager 3 and the disengaging vessel 8. Pressure taps 39 and 38 (via tap 42) are used with DPIC 37 for this purpose. Recycle gas, rich in hydrogen, and preferably a portion of that which is separated from the ultimate product effluent, is being introduced via line 21. A portion of this hydrogen-rich gas is being diverted via line 25, containing control valve 26, into disengaging vessel 8, exiting therefrom via line 35 containing control valve 36. Another portion is being diverted, from line 25, by line 27 containing restriction orifice 28; the flow through orifice 28 is continuous, and at a rate which purges hydrocarbons from the catalyst particles being withdrawn from reactor 1.

Before continuing with the explanation of Step V, it is believed that a description of lift-engager 3, into which catalyst particles flow via conduits 2, is warranted. Lift-engager 3 contains two concentric centerpipes 4 and 5, the latter extending upwardly as a lift line, or catalyst-transport conduit. The main body of lift-engager 3 is divided into a plurality of catalyst-collecting sections of substantially equal volume by means of vertical baffles 6 which terminate both a finite distance above the bottom and below the top of lift-engager 3. One each of catalyst-withdrawal conduits 2, generally numbering from 6 to 16, extends into each catalyst-holding section to a point below the upper edge of baffles 6. As the level of the catalyst particles in each of the vertical section attains the discharge end of the conduit in communication therewith, flow through the individual conduit automatically terminates. Eventually, and virtually simultaneously, all the catalyst-holding sections are filled and the removal of catalyst particles from reactor 1 ceases. This technique insures substantially uniform withdrawal of equal volumes of catalyst particles across the entire cross-sectional area of the catalyst bed disposed in reactor 1.

The commencement of Step V is triggered when level controller 10 indicates that disengager 8 is substantially void of catalyst particles. The logic-control system then calls for valve 22, in line 21, to be open to the extent that the velocity of the hydrogen purge stream through line 27, into the annular space created by the interior wall of lift-engager 3 and centerpipe 4, is increased to a level which will prevent the resumption of catalyst particle flow through conduits 2 when, in ensuing steps, the lift-engager is emptied, and simultaneously increases the pressure in lift-engager 3 to about 323 psig. This step terminates after a time-delay in which the position of valve 22 is verified and DPIC 37 indicates a zero pressure differential with respect to vapor-solids disengager 8; that is, valve 26 is caused to open further to permit the pressure in disengager 8 to attain a level of 323 psig. The increased flow of hydrogen purge gas through valve 22 and lines 21 and 27, is below that level which would result in a reversal flow of catalyst particles through conduits 2.

When DPIC 37 indicates a zero pressure differential, Step VI commences with valves 7 (in lift line 5) and 30 (in lift stream line 29) being opened. The hydrogen lift gas stream flows through line 29 and valve 30 into the annular space created between centerpipe 4 and lift line 5, at a velocity approximately equal to the flow of gas via line 35 through valve 36. At this stage, a solenoid valve (not illustrated) terminates the effect of DPIC 37 such that valve 26 is closed. The hydrogen lift gas flows downwardly through the annular space and causes the catalyst particles to be lifted from the lower portion of lift-engager 3, upwardly through lift line 5 and into vapor-solids disengager 8. As the catalyst head increases in lift line 5, the pressure within disengager 8 decreases, approaching a level of about 320 psig. as the lift-engager empties and the lift line becomes about 10.0 percent full of catalyst throughout its length. Meanwhile, it must be noted that valve 36, in line 35, continues to be controlling such that the desired lift flow upwardly through line 5 is being maintained. When the lift line is completely cleared of catalyst, the hydrostatic head of catalyst drops to zero so the pressure in disengager 8 returns to a level of about 323 psig.

Disengager 8 is designed with a chordal baffle 9 which divides the disengager into two segmental sections of different cross-sectional area. The catalyst particles and lift gas are discharged upwardly into that section having the lesser cross-sectional area, and are caused to reverse direction, while effecting a substantial decrease in the nominal linear velocity, thereby insuring that all catalyst, including fines and dust resulting from attrition, are separated from the vapors which are removed via line 35.

When the logic-control system determines that DPIC 37 again senses zero differential pressure, indicating the termination of Step V, valves 7, 22 and 30 are closed to start Step VI. The pressure in lift-engager 3 decreases to the reactor 1 pressure of 318 psig, at which time valves 30 and 22 are caused to close, and catalyst particles will once again flow through conduits 2 into lift-engager 3. Step VI terminates with the solenoid valve being reactivated such that DPIC 37 once again affects control valve 26, in line 25, to maintain a zero pressure differential between lift-engager 3 and disengager 8. When the logic-control system confirms that the pressures have been equalized, the "ready" step in the controlled sequence has been attained, and the cycle can be repeated in the manner above-described.

The foregoing is believed to illustrate the reactor-to-regenerator catalyst transport system of the present invention, as well as the controlled method for effecting the same.

We claim as our invention:

1. In a catalytic reaction system, having an integrated catalyst regeneration facility, wherein (1) a hydrocarbonaceous stream is reacted with hydrogen in contact with catalyst particles which are movable through said system via gravity-flow, (2) catalyst particles removed from said system are introduced into said regeneration facility and, (3) said catalyst particles are movable through said regeneration facility via gravity-flow, the method of transferring catalyst particles from said reaction system to said regeneration facility, which comprises the steps of:
   a. withdrawing catalyst particles from the bottom of a reaction zone through a plurality of catalyst-withdrawal conduits;
   b. introducing said catalyst particles, vis said conduits, into an upper portion of a withdrawal and transport vessel while simultaneously and continuously introducing a fluid purge stream into said vessel, and countercurrently flowing said purge stream through said conduits to remove hydrocarbons from said catalyst particles;
   c. when the level of catalyst particles in said transport vessel contacts the discharge end of said conduits, thereby automatically terminating the flow of catalyst particles therethrough, then introducing a fluid lift stream downwardly into an annular space formed by imperforate first and second concentric centerpipes, disposed in said vessel, at a velocity sufficient to lift said catalyst particles upwardly through the inner concentric centerpipe and out of said transport vessel;
   d. substantially simultaneously with the introduction of said fluid lift stream, increasing the velocity of said purge stream to a level which maintains the terminated flow of catalyst particles within said withdrawal conduits;

e. flowing the removed catalyst particles and said lift stream upwardly through a lift line and introducing the same into a fluid-solids disengaging vessel and separating said catalyst particles from said fluid lift stream;

f. when substantially all of the withdrawn catalyst particles have passed through said lift line into said disengaging vessel, (i) terminating the flow of said fluid lift stream, (ii) equalizing the pressure between said disengaging vessel and a valved lock hopper and, (iii) introducing said catalyst particles into said lock hopper;

g. isolating said lock hopper from said disengaging vessel and contacting said catalyst particles with an inert fluid purge stream to remove hydrogen therefrom;

h. equalizing the pressure between said lock hopper and a regeneration facility; and, i. introducing the resulting purged catalyst particles into the upper portion of said regeneration facility through a plurality of catalyst-transfer conduits.

2. The process of claim 1 further characterized in that said purged catalyst particles are introduced into a fines removal hopper prior to being transferred to said regeneration facility.

3. The method of claim 1 further characterized in that the increased velocity of said purge stream is below that level which effects a reversal of catalyst flow in said withdrawal conduits.

4. The method of claim 3 further characterized in that the velocity of said purge stream is decreased to about its former level after the termination of the flow of said lift stream.

5. The method of claim 1 further characterized in that the differential pressure between said transport vessel and said disengaging vessel is zero when said fluid lift stream is introduced.

6. The method of claim 1 further characterized in that the pressure between said disengaging vessel and said transport vessel is equalized after said catalyst particles have been introduced into said valved lock hopper and after said lock hopper is isolated from said disengaging vessel.

7. The method of claim 1 further characterized in that the said fluid purge and lift streams comprise hydrogen.

8. The method of claim 1 further characterized in that said inert purge stream is nitrogen.

9. The method of claim 1 further characterized in that said reaction zone and transport vessel are coaxially disposed.

10. The method of claim 2 further characterized in that said disengaging vessel, lock hopper and fines removal hopper are coaxially disposed.

* * * * *